June 15, 1926.
C. J. AULBACH
1,588,870
SIFTER TOP FOR RECEPTACLES
Filed Oct. 22, 1925
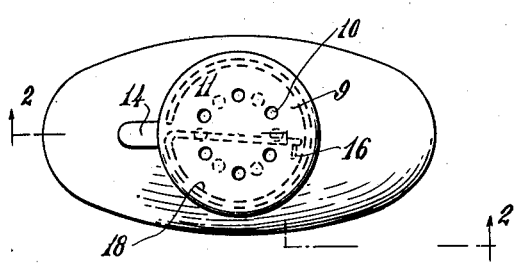
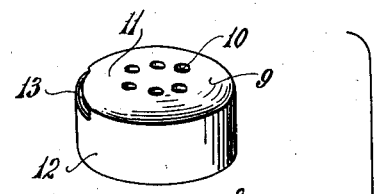
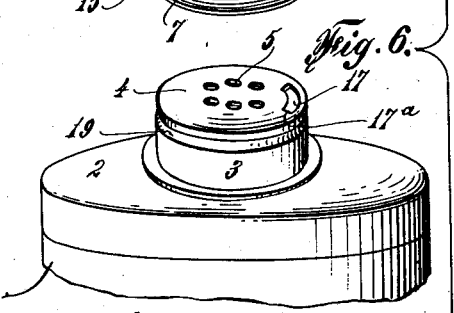
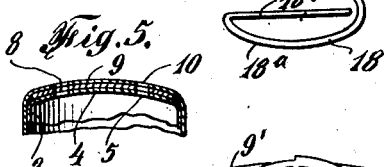
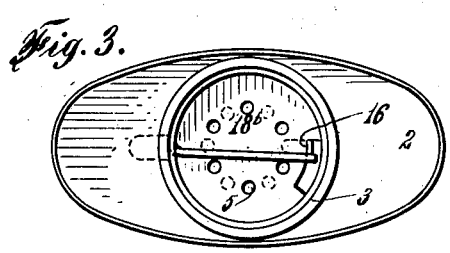
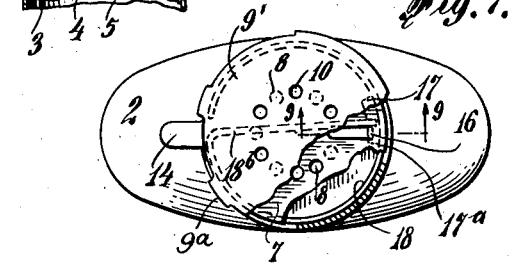
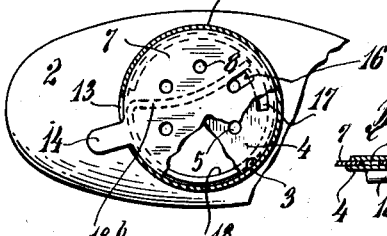
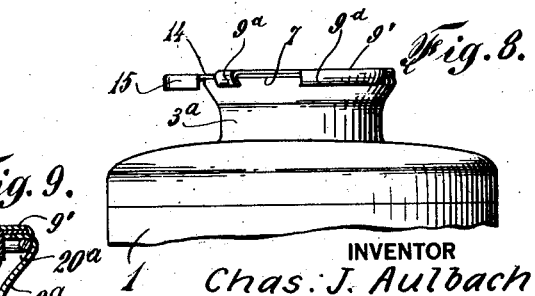
INVENTOR
Chas. J. Aulbach
BY
T. F. Bourne
ATTORNEY Patented June 15, 1926.

1,588,870

UNITED STATES PATENT OFFICE.

CHARLES J. AULBACH, OF PASSAIC, NEW JERSEY, ASSIGNOR TO PASSAIC METAL WARE COMPANY, OF PASSAIC, NEW JERSEY, A CORPORATION OF NEW JERSEY.

SIFTER TOP FOR RECEPTACLES.

Application filed October 22, 1925. Serial No. 64,124.

My invention relates to improvements in so-called sifter tops for receptacles, such as those adapted to contain toilet powder and analogous goods, and has for its object to provide simple and efficient means for normally retaining closed the outlets or holes through which the powder or the like is to be dispensed, which outlets or holes may be opened by convenient manual operation when the contents of the receptacle are to be dispensed or sifted out.

In carrying out my invention I provide the receptacle or container with a neck having a perforated top upon which is supported a rotative disk having perforations to control the perforations in the said top, with a perforated retainer over the disk and having perforations in permanent registration with the perforations in the top, and spring means within the neck cooperative with the disk for normally retaining the latter in position to close the perforations in the neck and retainer, whereby the disk may be rotated back and forth to open and close the last named perforations.

My invention also comprises details of improvement that will be more fully hereinafter set forth and then pointed out in the claims.

Reference is to be had to the accompanying drawings forming a part hereof, wherein:

Fig. 1 is a plan view of a receptacle embodying my invention;

Fig. 2 is a detail section on line 2, 2, in Fig. 1;

Fig. 3 is an inverted plan view looking into the neck of the receptacle;

Fig. 4 is a partly broken plan view illustrating the sifter disk in the open position;

Fig. 5 is a detail section;

Fig. 6 illustrates in perspective the several parts of my improvement in detached relation;

Fig. 7 is a partly broken plan view of a modification;

Fig. 8 is a side view of Fig. 7; and

Fig. 9 is a detail section on line 9, 9, in Fig. 7.

Similar numerals of reference indicate corresponding parts in the several views.

The receptacle or container 1 may be of any suitable or usual construction, such as in the nature of a tin can, the same being shown provided with a cap or top section 2 permanently secured to the container body by friction or in any other suitable way. The cap 2 is provided with a neck 3 having a top 4 provided with one or more perforations 5 through which powder or the like may be sifted from the receptacle. The neck 3 may be secured to the cap 2 by seaming the parts together, as indicated at 6 in Fig. 2, or in any other desired way. At 7 is a disk or plate fitted to rotate upon the top 4 and provided with one or more apertures 8 adapted to register with the apertures 5 for sifting the powder, the metal of the disk being adapted to normally close the apertures 5. A retainer for the disk 7 is indicated at 9, the same being provided with one or more apertures 10 located in register with the apertures 5 of the top 4, the disk 7 being rotatively retained upon the top of the neck by the retainer 9. In the form shown in Figs. 1 to 6 the retainer 9 has a top 11 that is provided with the apertures 10, and said top is provided with a flange or skirt 12 which fits snugly and friction-tight around the neck 3 with sufficient freedom between the tops 4 and 11 for rotation of the perforated disk 7. The periphery of the disk 7 is rotatively guided by the flange 12 of the retainer 9. At 13 is an annular slot in the retainer, shown located in the flange 12 at the juncture of the latter with the top 11, and the disk 7 is provided with a projecting finger piece 14 that extends through the slot 13 in position to be manipulated. By preference the edge portions of the finger piece 14 are bent laterally and toward the receptacle at 15 to afford smooth surfaces on opposite sides for the finger of the operator. The disk 7 is provided with an inwardly extending projection 16, which may be struck from the metal of the disk and which passes through an arcuate slot 17 in the top 4 of the neck in position to be engaged by a spring 18 that is located within the neck. The rotation of disk 7 in opposite directions is limited by the engagement of projection 16 with the metal at the ends of slot 17, or by engagement of finger piece 14 with the metal at the ends of slot 13.

The spring 18 is shown having an annular portion 18ª to fit within the neck 3 and having a transverse free operating portion 18ᵇ that extends across within the neck in position to engage at its free end with the projection 16 for normally retaining the disk 7 in position to close the apertures 5 and 10, and whereby when the disk is shifted its apertures 8 may register with the apertures 5 and 10 to permit sifting out of the powder or the like from the receptacle. Means are provided to retain the spring in proper position within neck 3. In the form shown in Figs. 1 to 6 the neck 3 is provided, at a suitable distance from the top 4, with an inwardly extending annularly disposed bead 19 providing a recessed portion 20 at the outer part of the neck, (Fig. 2), in which the annular portion of spring 18 is located so that the spring is retained from displacement lengthwise along the neck and to retain the projecting portion 18ᵇ in operative relation to the projection 16 of disk 7. The normal tension of the portion 18ᵇ of the spring is such as to bear against projection 16 to force it toward the end 17ᵃ of slot 17 to normally place the apertures 8 out of register with the apertures 5 and 10, (Fig. 1). When the finger piece 14 is moved from the position shown in Fig. 1 to the position shown in Fig. 4 the apertures 8 of disk 7 will be brought into register with the apertures 5 and 10 for sifting purposes, and at such time such movement of disk 7 will cause projection 16 to increase the tension of portion 18ᵇ of the spring 18. The spring 18 is placed in the recess 20 under compression pressure so its normal tendency is to expand in such recess into engagement with the neck 3 and when the disk is rotated the free end 18ᶜ of spring 18 will bear against the metal of the neck in such a way as to keep the spring from rotating within the neck.

In the form shown in Figs. 7, 8 and 9 the recess 20ᵃ for spring 18 is formed by flaring the outer portion of the neck 3ᵃ outwardly adjacent to the top 4, as indicated in Fig. 9, and the retainer 9' is provided with spaced flange portions 9ᵃ that are bent into engagement with the flaring portion of neck 3ᵃ for securing the retainer to the neck in such a way that the disk 7 may rotate freely therebetween, the finger piece 14 extending outwardly between flange portions 9ᵃ.

In accordance with my invention the disk will be normally retained by the spring in such position that its unperforated portion will register with the perforations 5 and 10 to close the same, and in order to sift powder or the like from the receptacle it is merely necessary to push the finger piece 14 in the direction shown in Fig. 4 to cause registration of the apertures 8 of the disk with the apertures 5 and 10. As soon as the finger piece is released the disk 7 will be automatically returned by spring 18 to the normal closure position. The disk 7 may be fitted snugly to rotate between the tops 4 and 11 in such a way as to prevent leakage of powder, and the receptacle having no side opening affords a secure means to prevent leakage of powder from the receptacle, particularly since the disk is guided to rotate in the space between the top of the retainer and the neck with the finger piece 14 located entirely outside of the neck, so that there is no side opening in the neck for the passage of powder.

Having now described my invention what I claim is:—

1. Sifter means for receptacles comprising a neck with a perforated top, a perforated disk rotative upon the top of the neck, means rotatively retaining the disk upon the neck, a spring having an annular portion held against rotation within the neck and having a transverse free portion extending across the neck, and means operatively connecting the disk and the transverse portion of the spring for normally retaining the disk in closed position.

2. Sifter means for receptacles comprising a perforated neck provided with a slot, a disk rotatively mounted upon the neck and provided with a projection extending through the slot, a spring within the neck cooperative with the projection for normally retaining the disk in closed position, and a retainer having a perforated top located over the disk and provided with flange means engaging the neck, said flange means rotatively retaining the disk between the neck and the retainer top, the disk being provided with means for manually rotating it.

3. Sifter means for receptacles as set forth in claim 2, in which the means for rotating the disk comprise a finger piece extending outwardly from the disk and a slot in the retainer in which the finger piece is operative.

4. Sifter means for receptacles comprising a neck having a perforated top and provided with an interior recess, a spring having an annular portion non-rotatively held in said recess and provided with a transverse portion extending across the neck, a perforated disk rotatively mounted upon said top and having means cooperative with the transverse portion of the spring for normally retaining the disk in closed position, means rotatively retaining the disk over the perforation in the top of the neck, the spring being operative to normally retain the material of the disk over the last named perforation, and means to operate the disk.

5. Sifter means for receptacles comprising a neck having a perforated top and having an inwardly extending bead located at a distance from the top providing an annular recess within the neck, a spring having an annular portion non-rotatively held within said recess and having a transverse free portion extending across the neck, a perforated disk rotatively mounted upon the top of the neck and having means cooperative with the transverse portion of the spring for normally retaining the disk in closed position, and means rotatively retaining the disk upon the top of the neck.

6. Sifter means for receptacles comprising a perforated neck, a spring within the neck, said spring having an annular portion within the neck fitted against the same, said spring having an end portion in engagement with the neck to resist rotation of the spring and having a free transverse portion extending across the neck, a perforated disk upon the neck provided with means cooperative with the transverse portion of the spring, and means rotatively retaining the disk upon the neck.

CHARLES J. AULBACH.